Feb. 13, 1951
C. G. ANDERSON
2,541,144
DISPENSER FOR SHEET MATERIAL
Filed June 9, 1948
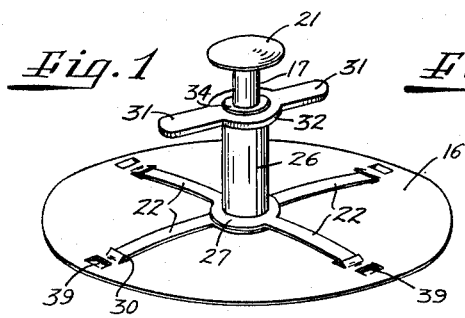
Fig.1
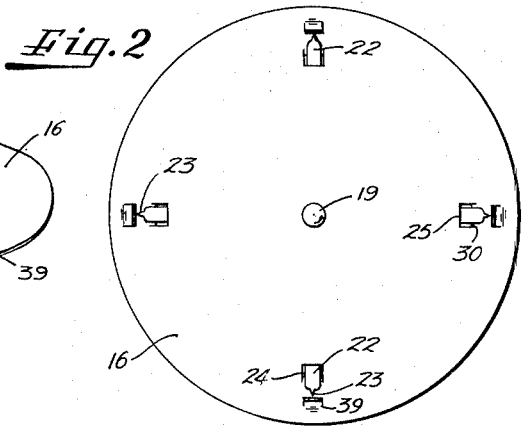
Fig.2
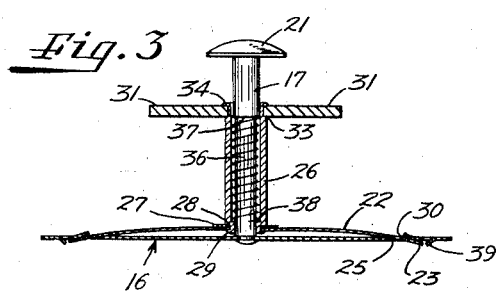
Fig.3
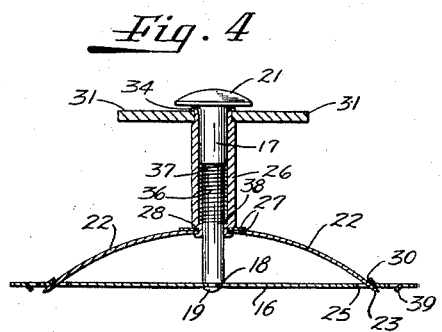
Fig.4
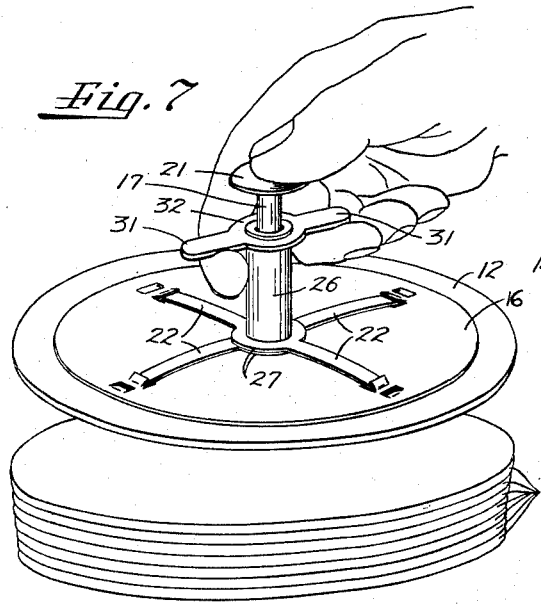
Fig.7
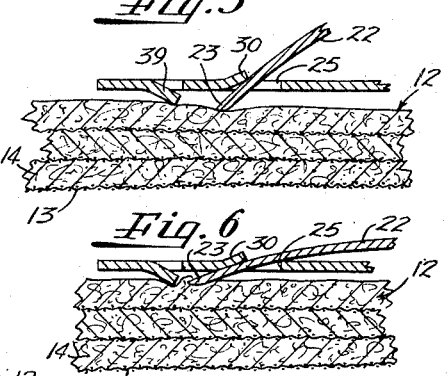
Fig.5
Fig.6
Inventor
Carl G. Anderson
By
McCanna and Morsbach
Attys.

Patented Feb. 13, 1951

2,541,144

UNITED STATES PATENT OFFICE 2,541,144

DISPENSER FOR SHEET MATERIAL

Carl G. Anderson, Rockford, Ill.

Application June 9, 1948, Serial No. 31,972

10 Claims. (Cl. 294—93)

This invention relates to dispensers for sheet material, and more particularly to dispensers for filter discs and the like.

It has long been a problem to satisfactorily handle filter discs so that they may be transferred from their shipping cartons or packages to a point of use in a sanitary condition. At the present time State statutes require that all milk sold to the public be filtered as it is poured from an open milking pail or the like to a shipping container. The purpose of this filter is obviously to provide clean milk to the ultimate consumer by keeping the bacteria count in the milk at a minimum. At the present time this is not always possible. For example, most filtering mechanisms comprise an annular clamping device for retaining a removable filter disc. At frequent intervals the filter disc must be changed. This is done simply by releasing the filter clamping mechanism and removing the filter disc, by hand, and then placing a clean filter disc, by hand, in the filter retaining device. Unless the milker is extremely careful, handling the clean filter disc in this manner usually results in contaminating the disc since the bacteria and the like from his hands, which frequently are none too clean, get on the filter disc and then during the filtering process the bacteria, transferred from his hands to the filter, get into the milk. The bacteria are not kept to a minimum and the purpose of the filter is defeated. Accordingly, an object of the present invention is to provide a device for transferring filter discs from their original containers to a point of use in a sanitary condition.

Another object of the invention is to provide a dispenser of the above character that is positive in its action, that is rugged and sturdy, and that is relatively inexpensive to manufacture.

Another object of the invention is to provide a dispenser of the above character for transferring a filter disc from its original container to a point of use that does not tear or damage the filter disc so that it is unusable.

Another object of the invention is to provide a novel dispensing mechanism of the above character that may also be used for handling sheet material.

Other objects and advantages of the invention will become apparent from the following detailed description taken in connection with the accompanying drawings, in which—

Figure 1 is a perspective view of a dispenser embodying the present invention;

Fig. 2 is a bottom view of the dispenser;

Fig. 3 is an elevational view with parts shown in section;

Fig. 4 is a view similar to Fig. 3 with the component parts in a retracted position;

Fig. 5 is a sectional fragmentary view showing the dispenser resting on a stack of filter discs and with the component parts of the dispenser in the position shown in Fig. 4;

Fig. 6 is a fragmentary sectional view similar to Fig. 5 but with the component parts of the dispenser in the position shown in Fig. 3, and Fig. 7 is a perspective view of the dispenser showing the dispenser with a filter disc attached thereto in a position above the stack.

The invention is concerned with a dispensing device for sheet material and the like. Referring now particularly to the drawings the invention is shown embodied in a dispenser for filter discs 12 of the type conventionally used in dairies for filtering milk as it is poured from a milking pail into a milk shipping container. These discs are generally circular in form and may comprise a layer 13 of gauze and one or more layers 14 of cotton filter material mounted in side by side relation with the gauze to form a composite laminated structure.

In this embodiment the dispenser comprises a body 16, in the form of a circular disc of slightly smaller diameter than the diameter of the filters 12 as seen in Fig. 7. Projecting outwardly from one side of the disc 16 is a handle 17, rigidly secured to the disc 16. For this purpose the lower end of the handle 17 is formed with a reduced portion providing a shoulder 18. The reduced portion is shaped to project through an aperture in the disc 16 so that the shoulder 18 engages one side of the disc. The extreme lower end 19 of the handle is then peened over to engage the opposite side of the disc so that the handle 17 is rigidly secured thereto. The outer end of the handle 17 terminates in an enlarged head portion 21. Extending radially of the disc 16 is a plurality of resilient arms or fingers 22. For purposes of illustration four arms are shown although it is to be understood that any desired number of arms may be employed. Adjacent the periphery of the disc 16 the ends 23 (see Fig. 2) of the arms 22 extend through radially disposed apertures 24 formed in the disc 16. The arms 22 are mounted for movement between preselected positions shown respectively in Figs. 3 and 4. In Fig. 3 the lower sides of the arms 22 adjacent the outer ends 23 rest on the inwardly disposed walls 25 of the apertures 24 and the upper sides of the arms 22 engage the outwardly disposed walls 30 of the apertures 24 so that the ends 23 are inclined at a relatively small angle with respect to the bottom surface of the disc 16. In Fig. 4 the arms 22 are positioned so that the upper sides of the arms 22 engage the outwardly disposed walls 30 of the apertures 24 so that the ends 23 are displaced radially inwardly from their position shown in Fig. 3 and the ends 23 are inclined at a relatively large angle with respect to the bottom surface of the disc 16. To effect this movement of the arms 22 their opposite ends are fixedly secured to one end of a sleeve 26 encircling the handle 17 and movable between the head portion 21 and the disc 16. As best shown in Figs. 1 and 7 the diametrically opposite arms 22 extend outwardly from collars 27 and are formed as single stampings. These collars are slipped over a reduced end portion at the lower end of the sleeve 26 and are positioned by a shoulder 28 formed on the sleeve 26. The extreme lower end of the sleeve 26 is peened over as shown at 29 to fixedly secure the collars 27 and the arms 22 to the sleeve 26. At its upper end the sleeve 26 is provided with lateral extensions 31 extending outwardly from a collar 32 slipped over a reduced portion at the upper end of the sleeve 26. The collar rests against a shoulder 33 and is secured in this position as by peening over the extreme upper end 34 of the sleeve 26. The sleeve 26 is normally biased to the position in which the extreme lower end 29 abuts against the disc 16 as by spring 36. As best seen in Fig. 3 the spring embraces an intermediate portion of the handle 17 and acts between a shoulder 37 formed at the upper end on the handle 17 and a shoulder 38 formed at the lower end of the sleeve 26.

The outer ends 23 of the arms 22 are preferably formed as needle points as best seen in Fig. 2 so that they can penetrate the filter discs without damaging them. Disposed adjacent each needle point 23 is a guard 39 which may be formed by depressing a portion of the disc 16 outwardly from the disc in the direction of the needle points 23. The purpose of the guards is to prevent accidental contact by the operator with the needle points 23. Preferably the guards should extend slightly below the needle points when the latter are in their retracted positions such as shown in Fig. 3 so that when the dispenser is placed on a flat surface the needle points are not bent or damaged.

The component parts of the dispenser may be formed from any suitable material. It is preferable however to utilize materials such as aluminum or stainless steels which do not readily corrode to a point at which the parts are unusable. The parts may be molded, die-cast, formed from metal stampings, or other suitable processes.

To utilize the dispenser the unit is grasped so that the operator's middle finger and index finger are disposed below the lateral extensions 31 on opposite sides of the handle 17 and the thumb of the operator rests on the head 21. The lateral extensions 31 are then pulled upwardly so that the sleeve 26 is moved to the position shown in Fig. 4. In pulling the sleeve to the position shown in Fig. 4 the ends 23 of the arms 22 are pulled upwardly in unison with movement of the sleeve 26. The pointed ends 23 of the arms 22 engage the outer side walls 30 of the apertures 24 and due to the resiliency of the arms are caused to be inclined at a relatively sharp angle with respect to the bottom of the disc 16. With the ends 23 of the dispenser in the position shown in Fig. 4 the dispenser is moved into position overlying a stack of filter discs 12. The body 16 is then disposed so that it rests on the top filter disc 12 and is preferably disposed centrally thereof. This position of the parts is shown in Fig. 5. The operator then releases the extensions 31. The spring 36 acts to move the sleeve 26 downwardly to the position shown in Fig. 3. As the arms 22 return to this position the ends 23 of the arms are caused to be displaced radially outwardly from their position shown in Fig. 4 to penetrate the upper layer 14 of filter material on the filter disc 12 such as shown in Fig. 6 and the arms engage both the inner walls 25 and the outer walls 30 of the apertures 24. With the parts shown in Fig. 6 the top disc on the stock is securely fixed to the dispenser. Thereafter the operator grasps the lateral extensions 31 between the middle and index fingers and raises the dispenser with the disc 12 secured thereto from the stack as shown in Fig. 7. The dispenser and disc 12 may be then transferred to any desired station. When it is desired to release the filter disc 12 from the dispenser it is only necessary for the operator to again place his thumb on the head 21 and apply a pressure between the head 21 and the extensions 31 so that the sleeve 26 moves to its outer position against the action of the spring 36. As the sleeve is moved to its outer position the needle points 23 are displaced radially inwardly from their position shown in Fig. 6 to be withdrawn from the disc filter 12 so that they again assume the position shown in Fig. 5. During this movement of the needle points 23 the filter disc 12 abuts against the disc 16 and is in effect stripped from the dispenser.

From the aforegoing it is to be understood that the transfer of a filter disc from its original container may be made in a sanitary condition and that the operator's hands need never touch the filter disc. As a result, milkers utilizing this filter dispenser are assured that there is a minimum of contamination of the filter disc. It is to be understood also that the ends 23 of the arms 22 are formed as needle points so that when they engage the filter disc they do not tear the disc or cause holes to be torn therein during the transfer of a filter disc from its original container to its point of use.

I claim:

1. In a dispensing device for filter discs and the like, the combination of a body having a substantially smooth flat surface on the side a handle rigidly attached to and extending outwardly from the other side of said body, a plurality of radially extending resilient arms, each of said arms having a first end disposed to terminate on said one side of said body adjacent the flat surface and shaped to penetrate a filter disc and a second end on the other side of said body and disposed adjacent the handle, said first end being movable between a position in which it is inclined at a relatively large angle with respect to said flat surface of the body to facilitate engagement and disengagement of said end with a disc when the latter is disposed adjacent the flat surface and a position in which said first end is inclined at a relatively small angle to said flat surface of the body and displaced radially from its first position and penetrates the disc to secure it against said surface of the body, and means connected to the second end of each arm movable relative to said handle between preselected positions for effecting movement of the first ends between the aforegoing positions.

2. The combination of claim 1 with spring means for biasing said last mentioned means to one of its preselected positions.

3. In a dispensing device, the combination of a support having a surface on one side shaped to permit face to face contact with a filter disc and the like and having a plurality of annularly spaced apertures defined in part by inner and outer radially disposed side walls, a handle rigidly connected to and extending outwardly from the other side of said support, a plurality of radially extending arms mounted on said support, each of said arms having a portion disposed on the side of the support from which the handle projects and a portion extending through one of the apertures to said one side of the body and terminating in a sharply pointed end adjacent said surface, and means for moving said arms between positions in which the pointed end portions engage the outer side walls defining the apertures to cause the pointed ends to be disposed at a relatively large angle with respect to said surface and a position in which the pointed end portions engage both the inner and outer side walls of the apertures to cause said pointed ends to be inclined at a relatively small angle with respect to said surface and to be radially displaced from their first position.

4. In a dispenser for filter discs and the like, the combination of a support having a handle on one side and a surface on the other side shaped for face to face contact with a filter disc, radially disposed means mounted on said support for engagement with a filter disc when the latter is disposed adjacent said surface, and means for moving said latter means between a position in which said first means is inclined at a relatively large angle with respect to said surface to be positioned to penetrate a filter disc in contact with said surface and a position in which the first means is inclined at a relatively small angle with respect to said surface and displaced radially from its first position to be positioned to penetrate but not pierce said filter disc to secure the latter adjacent said surface.

5. A dispenser for filter discs and the like, comprising a support, a handle rigid with said support having a surface on one side shaped for face to face contact with a filter disc and extending outwardly therefrom on the other side, a sleeve mounted on said handle for movement between preselected positions, a plurality of resilient arms mounted on said support and extending radially thereof, said arms having an end connected to said sleeve and a pointed end projecting through said support, each pointed end being movable between a position in which it is inclined at a relatively large angle with respect to said surface to engage a filter disc when the support rests thereon and a position in which it is inclined at a relatively small angle to said surface and disposed radially outwardly from its first position for securing the filter disc adjacent the opposite side of the support.

6. In a dispensing device for sheet material, the combination of a body having a surface on one side shaped for face to face contact with a sheet of material, a handle rigid with said body and extending outwardly from the other side thereof, a plurality of radially extending resilient arms, each of said arms having a first end disposed adjacent said surface of said body and a second end disposed on the other side to be adjacent the handle, said first end being movable between a position in which it is inclined at a relatively large angle with respect to said surface for engaging and releasing a sheet of material when the latter is disposed adjacent said surface and a position in which said first end is inclined at a relatively small angle to said surface and displaced radially from its first position to penetrate said sheet of material to secure the latter adjacent the body, and means connected to the second end of each arm movable relative to said handle for effecting movement of the first ends between the aforegoing positions.

7. The combination recited in claim 6 in which the first ends of the arms are formed as needle points.

8. The combination in claim 6 with guards formed on the body adjacent the first ends of the arms shaped to project outwardly from said surface and positioned to protect the ends from damage and being accidentally contacted by an operator.

9. In a dispensing device for filter discs and the like, the combination of a circular disc having a bottom surface shaped to have face to face contact with a filter disc and having a plurality of annularly spaced apertures spaced outwardly from the center of said disc, a handle rigid with said disc and extending outwardly from the top surface thereof, a head on said handle adapted to provide a rest for an operator's thumb, a plurality of radially extending resilient arms, each of said arms having a first portion extending through one of said apertures and terminating adjacent the bottom surface and shaped to penetrate a filter disc, each of said arms having a second portion on the top surface of said body disposed adjacent the handle, said first portion being movable between a position in which it is inclined at a relatively large angle with respect to said bottom surface of the disc to facilitate engagement of said first portion with a filter disc when the latter is disposed adjacent the bottom surface and a position in which said first portion is inclined at a relatively small angle to said bottom surface and displaced radially from its first position and penetrates the filter disc to secure it against the bottom surface, a sleeve connected with each of said second portions of the arms and mounted on said handle for movement between opposed positions to effect the above described movements of the first portion of each arm, and lateral extensions on the sleeve positioned to be grasped by a pair of fingers of the operator whereby a pulling force between the thumb and the pair of fingers of the operator moves said sleeve between said opposed positions.

10. The combination recited in claim 9 in which the first portions of the arms terminate in needle points and means is provided on the bottom surface for limiting the penetration of the needle points into the filter disc to permit penetration and prevent piercing thereof.

CARL G. ANDERSON.

REFERENCES CITED

The following references are of record in the file of this patent:

UNITED STATES PATENTS

| Number | Name | Date |
|---|---|---|
| 441,721 | Trumbore | Dec. 2, 1890 |
| 965,590 | Lokody | July 26, 1910 |
| 2,108,145 | Short | Feb. 15, 1938 |

Certificate of Correction

Patent No. 2,541,144                                            February 13, 1951

CARL G. ANDERSON

It is hereby certified that error appears in the printed specification of the above numbered patent requiring correction as follows:

Column 4, line 49, for the words "the side a" read *one side, a*; column 5, lines 45 and 46, strike out "having a surface on one side shaped for face to face contact with a filter disc" and insert the same in line 44, after "support" and before the comma;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*